(12) United States Patent (10) Patent No.: US 7,612,906 B2
Toda (45) Date of Patent: Nov. 3, 2009

(54) DATA OUTPUT APPARATUS, DATA OUTPUT METHOD, PROGRAM, AND STORAGE MEDIUM

(75) Inventor: Masayuki Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 11/223,724

(22) Filed: Sep. 9, 2005

(65) Prior Publication Data

US 2006/0055975 A1 Mar. 16, 2006

(30) Foreign Application Priority Data

Sep. 10, 2004 (JP) ............................. 2004-264596

(51) Int. Cl.
*G06F 15/00* (2006.01)
*G06F 11/00* (2006.01)
(52) U.S. Cl. ....................................... 358/1.16; 400/76
(58) Field of Classification Search ................ 358/1.15, 358/452, 1.1, 1.14, 1.13, 1.18; 400/76, 70, 400/82, 63, 88, 124.08; 705/1, 12, 14, 26, 705/39, 41; 711/101, 115, 163; 455/556.1; 370/401
See application file for complete search history.

(56) References Cited

U.S. PATENT DOCUMENTS

| | | | | |
|---|---|---|---|---|
| 6,157,460 A | * | 12/2000 | Matsuo et al. | 358/1.17 |
| 6,623,190 B1 | | 9/2003 | Lutz | 400/76 |
| 6,735,665 B1 | | 5/2004 | Kumagai et al. | 711/101 |
| 2002/0051167 A1 | * | 5/2002 | Francis et al. | 358/1.14 |
| 2005/0286090 A1 | * | 12/2005 | Ahne et al. | 358/452 |

FOREIGN PATENT DOCUMENTS

| | | |
|---|---|---|
| JP | 02-062685 | 3/1990 |
| JP | 2004-042394 | 2/2004 |
| KR | 10-2002-021742 | 3/2002 |

* cited by examiner

*Primary Examiner*—Saeid Ebrahimi Dehkordy
(74) *Attorney, Agent, or Firm*—Cowan, Liebowitz & Latman, P.C.

(57) ABSTRACT

There is provided a data output apparatus, data output method, program, and storage medium which preferably execute a printing process using print data input to the printing apparatus via an external storage device without decreasing the speed of the printing process while ensuring a security of classified information contained in the print data. Print data stored in a detachable external storage device such as a removable medium is input, and then the print data is developed to image data printable by the printing apparatus. The developed image data is printed out on a printing medium. Upon the development process of the print data to the image data, the development process is executed while switching the first mode to execute the development process using a storage area of the external storage device and the second mode to execute the development process using a storage area of the printing apparatus.

11 Claims, 8 Drawing Sheets

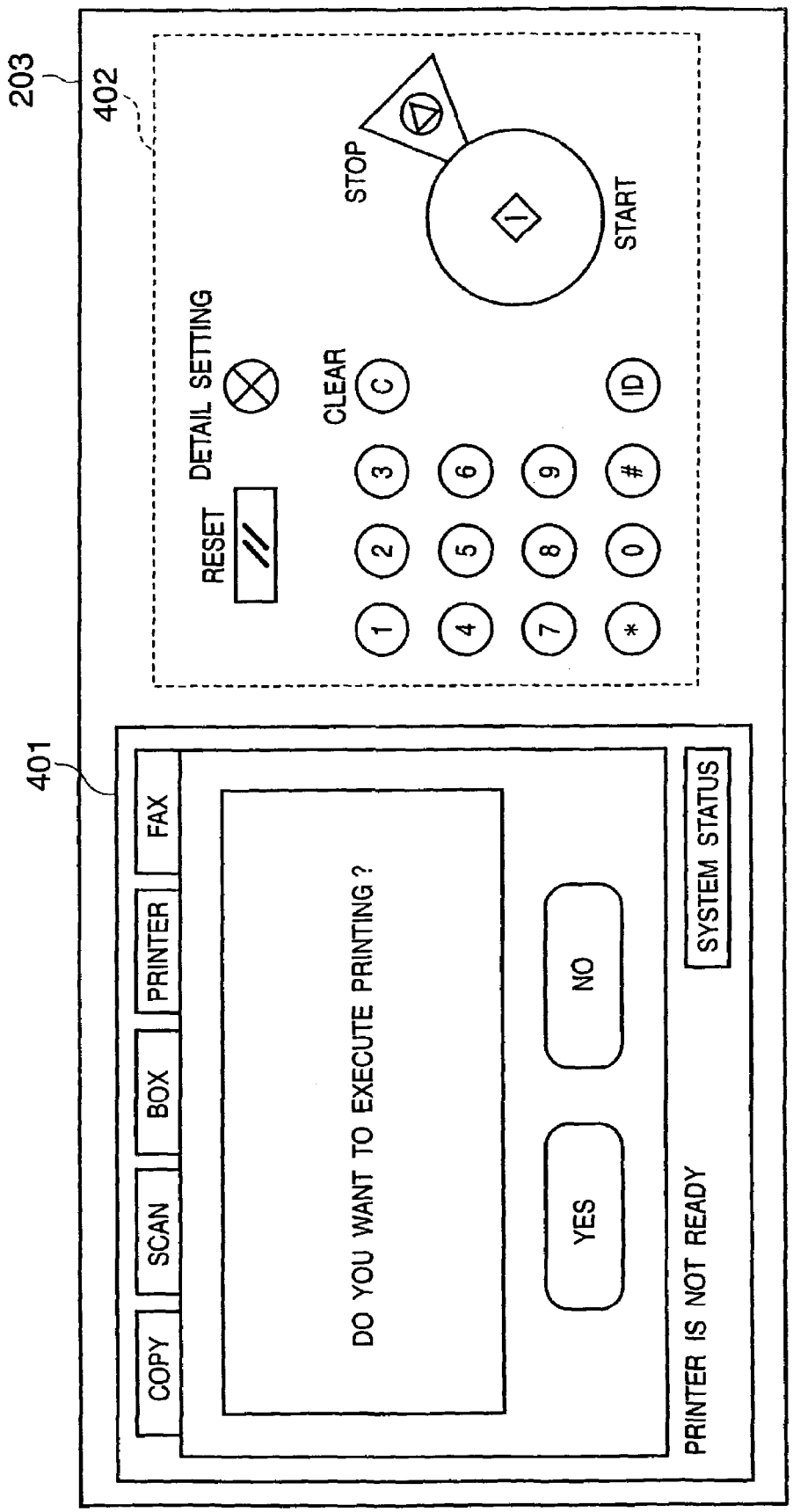

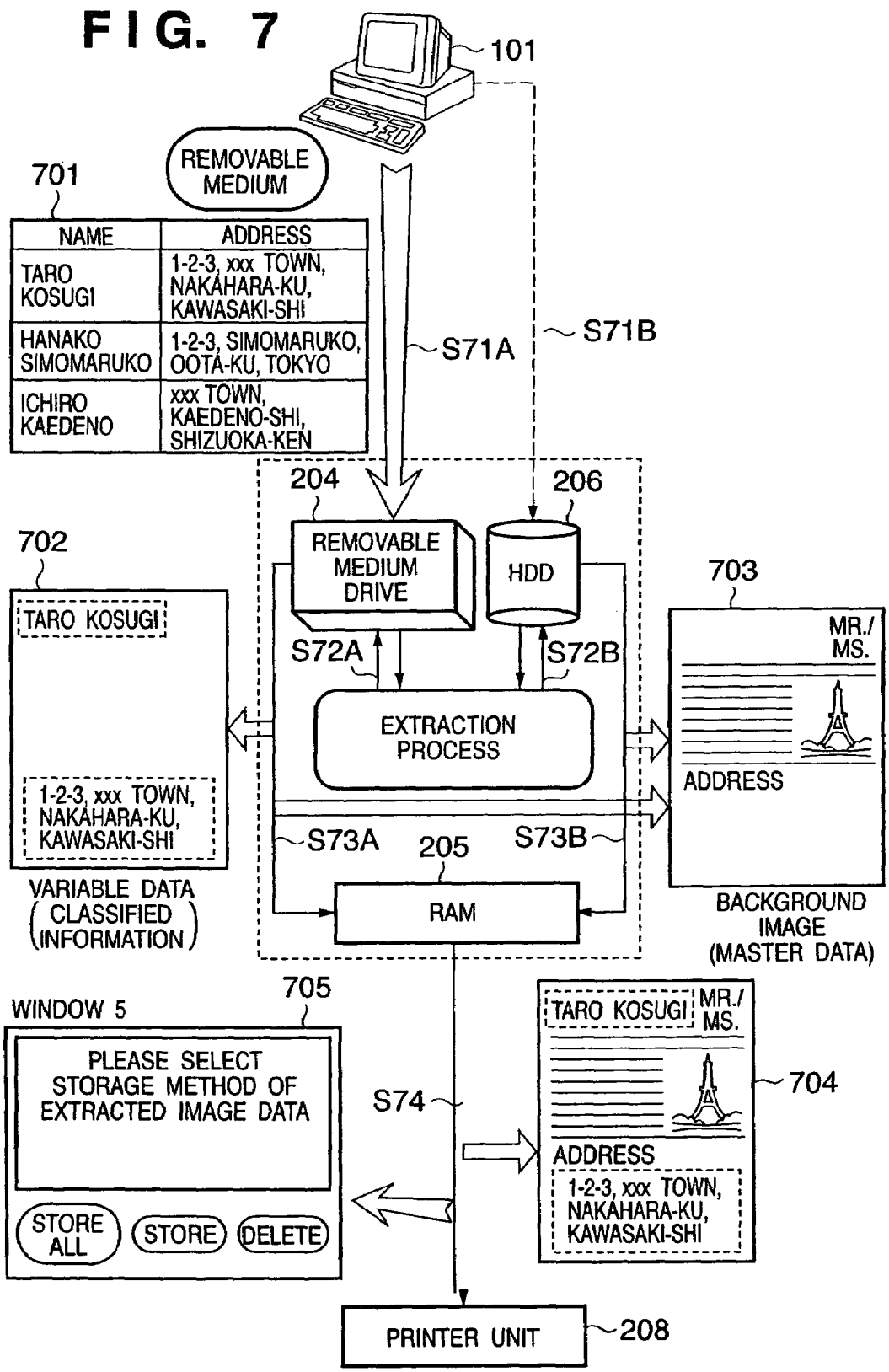

DATA OUTPUT APPARATUS, DATA OUTPUT METHOD, PROGRAM, AND STORAGE MEDIUM

FIELD OF THE INVENTION

The present invention relates to a data output apparatus, data output method, program, and storage medium which print out print data stored in a detachable external storage device.

BACKGROUND OF THE INVENTION

In a printing system using a digital copying machine, a method of allowing a printing apparatus via a network to receive and print print data generated on a network-connected client computer is available. In a POD (Print On Demand) market such as a near-print market, there is a system called a web submission system which utilizes the Internet. In this system, a predetermined procedure is executed on a homepage for web submission of a printing company and print data to be ordered to print is transmitted.

As an alternative method, there is a system which executes printing from print data stored in a removable medium in a CD-ROM drive, MO drive, or the like, connected to a printing apparatus. In this system, for example, when a user brings print data directly to a printshop, he or she stores the print data generated on a client computer in an external storage device such as a removable medium connected to the computer. The print data stored in the removable medium or the like is submission data in a form of PDL (Page Description Language) data or in a direct printable format (a format of PDF, TIFF, JPEG, or the like). The printshop executes the printing directly from the removable medium or the like.

The above printing method is not only aimed at printing at a printshop or the like but is also applied to printing for personal use using a printing apparatus away from home. That is, when a printing apparatus which a user can use away from home is not connected to a network, he or she can print out print data by the printing apparatus by storing print data in a removable medium and carrying it. As a patent reference concerning the present application, Japanese Patent Laid-Open No. 2004-042394 (patent document 1) can be enumerated.

However, print data input from, e.g., a removable medium to a printing apparatus and developed to printable image data often contains classified information such as personal information. For example, in variable data printing (VDP) which switches only some part of a job to data specific to each distribution destination user and prints out the resultant data, the classified information such as user's address, birthday, and the like, is often used as a data part specific to each user.

In a printing system using a digital copying machine, developed image data and the like are generally stored in a hard disk (HDD) or the like in the printing apparatus after the data is printed out. However, in a printing system which does not have a function to completely delete the printed data, the security of the print data is not ensured perfectly since the data may be printed out by the third party without permission.

In addition, even in a printing system in which data is completely deleted after the printing process so as to improve security, labor is required to write random data many times in order to delete the data completely from the HDD. This causes adverse effect on process performance of the system.

SUMMARY OF THE INVENTION

The present invention has been made in consideration of the above situation, and has as its object to provide a data output apparatus, data output method, program, and storage medium which preferably execute a printing process using print data input to the printing apparatus via an external storage device without decreasing printing process speed while ensuring security of classified information contained in the print data.

In order to solve the above problems, the present invention provides a data output apparatus comprising:

an input unit adapted to be capable of inputting at least data of a specific storage unit;

an output unit adapted to output input data; and a controller adapted to generate data to be output by the output unit using a storage area of the specific storage unit when output of data of the specific storage unit is executed by the output unit.

In order to solve the above problems, the present invention further provides a data output method comprising:

a step of inputting data using an input unit adapted to be capable of inputting at least data of a specific storage unit;

a step of outputting data using an output unit adapted to output input data; and a step of controlling using a controller adapted to generate data to be output by the output unit using a storage area of the specific storage unit when output of data of the specific storage unit is executed by the output unit.

In order to solve the above problems, the present invention further provides a program making a computer execute the data output method.

In order to solve the above problems, the present invention further provides a computer readable storage medium storing a program for making a computer execute the data output method.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 4B is a view showing the outer appearance of another example of the display unit 203 of the image printing apparatus 200 according to the first embodiment of the present invention;

FIG. 7 is a view for schematically explaining a flow of a variable data printing process in the second embodiment of the present invention.

DETAILED DESCRIPTION OF THE PREFERRED EMBODIMENTS

Embodiments of the present invention will be described in detail with reference to the accompanying drawings.

First Embodiment

Figure 1:
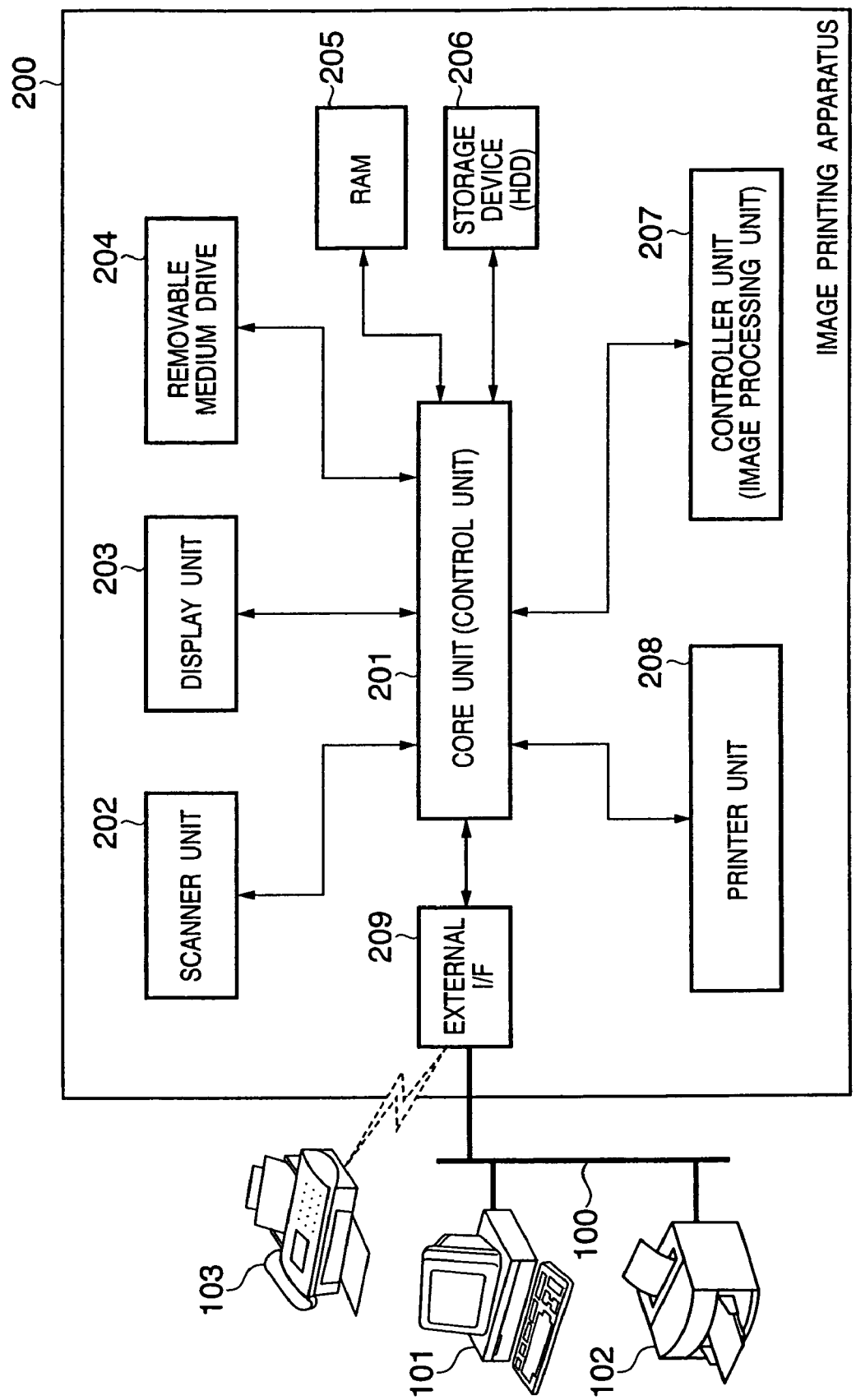
FIG. 1 is a block diagram schematically showing the arrangement of an image printing apparatus according to the first embodiment of the present invention.

FIG. 1 is a block diagram schematically showing the arrangement of an image printing apparatus according to the first embodiment of the present invention. In FIG. 1, an image printing apparatus 200 is connected to a network 100 via an external I/F (interface) 209. Note that a host computer 101 and another printer 102 are connected to the network 100 and can communicate various kinds of data with the image printing apparatus 200. The image printing apparatus 200 can communicate with a facsimile (FAX) apparatus 103 via a telephone line connected to the external I/F 209.

The image printing apparatus 200 comprises a core unit (control unit) 201, scanner unit 202, display unit 203, removable medium drive 204, RAM 205, storage device (HDD) 206, controller unit (image processing unit) 207, and printer unit 208 as components. The core unit 201 controls the overall image printing apparatus. The scanner unit 202 reads an original document image. The display unit 203 serves as a user interface having a display function and input function for users. The removable medium drive 204 serves as a driving device of a removable medium such as a flexible disk or MO disk. The storage device 206 has an area for temporarily storing image data (e.g., bitmap image) generated by developing PDL data as print data or printed PDL data and an area for storing font data and the like. The controller unit 207 executes image processing required for each job such as copy, print, and FAX. The printer unit 208 prints out data on a printing medium.

The RAM 205 comprises a PDL buffer (not shown) as a buffer for temporarily storing the PDL data received via the network 100 from the host computer 101 and a frame memory (not shown) for temporarily storing the image data obtained by developing the PDL data.

That is, the image printing apparatus 200 stores the PDL data supplied via the network 100 from the host computer 101 in the HDD 206 once, temporarily stores the data in the PDL buffer in the RAM 2.05, and then develops the data in the frame memory (frame buffer) in the RAM 205 to generate the image data. In this case, all operations are performed under the control of the core unit 201. For example, when the image data is developed in the frame memory in the RAM 205, under the control of the core unit 201, the image data for full-color printing or gray-scale printing is generated or another image processing required in accordance with a print job setting is performed in the controller unit 207.

The image data developed in the frame memory in the RAM 205 is sent to the printer unit 208 as CMYK data (K data in the case of gray-scale printing) and printed on a printing medium such as a paper sheet. The image data read and obtained by the scanner unit 202 is also supplied to the printer unit 208 and printed on a paper sheet or the like.

The printer unit 208 has a function of outputting e.g., a color or gray-scale image with a resolution of 600 dpi. The printer unit 208 is implemented by an electrophotographic image forming device which is capable of outputting a full-color image. The printer unit 208 has a function as a copying machine or scanner for copying an original document and a function as a printer or FAX apparatus for printing out the PDL data supplied from the host computer 101.

Figure 2:
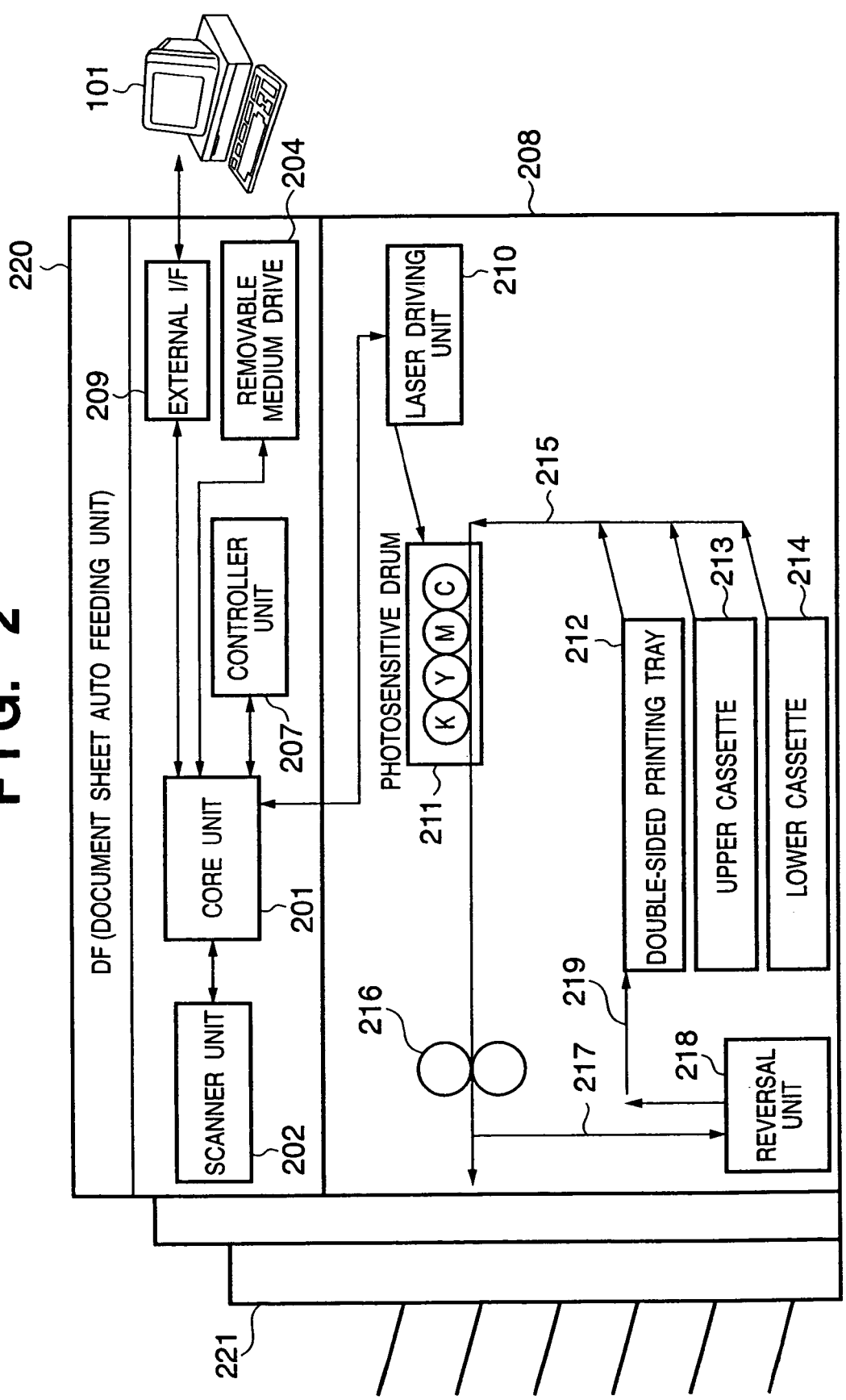
FIG. 2 is a block diagram showing the detailed arrangement of a printer unit 208 in the image printing apparatus 200 shown in FIG. 1.

FIG. 2 is a block diagram showing the detailed arrangement of the printer unit 208 in the image printing apparatus 200 shown in FIG. 1. Note that the same components as in FIG. 1 are donated by the same reference numerals in FIG. 2 and a repetitive description will be omitted.

As shown in FIG. 2, the image printing apparatus 200 comprises a document sheet feeding unit (to be referred to as "DF (Document Feeder)" hereinafter) 220, double-sided printing tray 212, upper cassette 213, lower cassette 214, photosensitive drum 211, laser driving unit 210, fixing unit 216, and reversing unit 218. The DF 220 sequentially conveys a plurality of original documents loaded in a predetermined position to a original document reading position one by one. The upper cassette 213 and lower cassette 214 contain paper sheets on which images are to be output. The photosensitive drum 211 accepts the paper sheet from the cassettes 213 and 214 via a conveyance path 215. The laser driving unit 210 converts the C, M, Y and K image data supplied from the core unit 201 into laser beams and has the laser beams scanned on the photosensitive drum 211 to generate a latent image. The fixing unit 216 fixes a toner image. The reversing unit 218 reverses the paper sheet delivered from the fixing unit 216 and supplies the paper sheet via a conveyance path 217 to the double-sided printing tray 212.

The scanner unit 202 reads an original document placed in an original document reading position of the scanner unit 202 manually or by the DF 220, generates RGB data corresponding to the original document, and sends the RGB data to the controller unit 207.

When the image printing apparatus 200 is used as a copying machine, the controller unit 207 converts the RGB data received from the scanner unit 202 into YMCK data, executes required image processing on the data, and sends the resultant data to the printer unit 208 on the basis of the control of the core unit 201. When the image printing apparatus 200 is used as a printer, the controller unit 207 converts the print data received via the external I/F 209 from the host computer 101 or the like into YMCK data, executes required image processing, and sends the resultant data to the printer unit 208 on the basis of the control of the core unit 201.

The laser driving unit 210 converts the C, M, Y and K image data into laser beams on the basis of the YMCK data received from the core unit 201. The laser driving unit 210 has the laser beams scanned on the photosensitive drum 211 to make a latent image. The latent image is developed by a developer (not shown) to become a visible image (toner image), and transferred on a paper sheet conveyed to the photosensitive drum 211 via the conveyance path 215, and the toner image is fixed by the fixing unit 216.

In a mode to form images on two sides of a printing medium (e.g., paper sheet), the reversing unit 218 reverses the paper sheet supplied via the conveyance path 217 after the toner image for one side of the paper sheet is transferred on the paper sheet, then supplies the paper sheet to a conveyance path 219. The photosensitive drum 211 transfers the toner image on the other side of the paper sheet conveyed by the conveyance path 215 via the double-sided printing tray 212. The fixing unit 216 fixes the toner image transferred on the paper sheet and discharges the paper sheet to a delivery tray 221. The delivery tray 221 has a finishing function such as punching (punch), stapling and bookbinding (folding) in addition to a function of sorting or grouping the paper sheets and outputting them to respective output bins.

Figure 3:
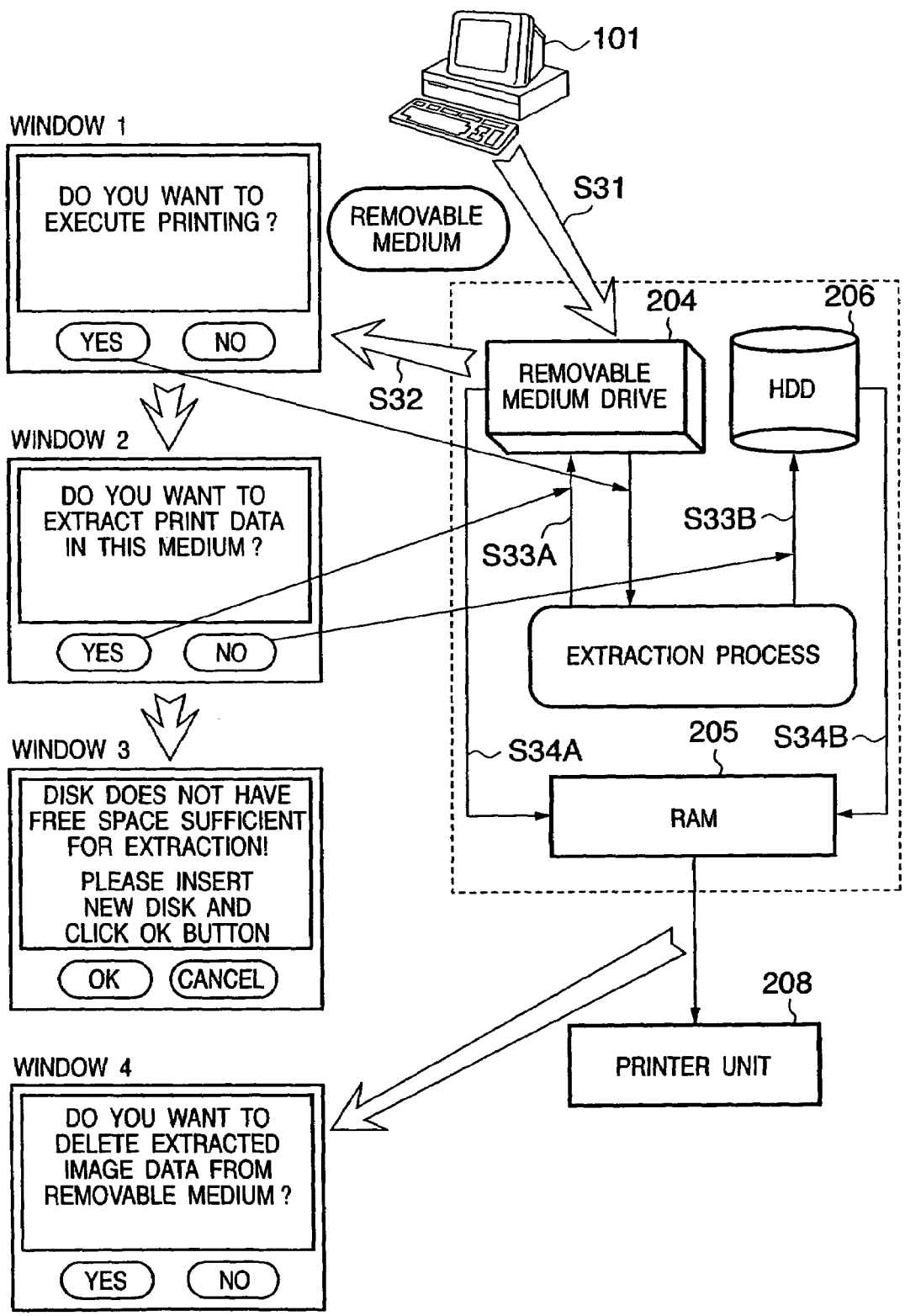
FIG. 3 is a view for schematically explaining a processing sequence for printing a print job stored in a removable medium serving as an external storage device by using the image printing apparatus 200.

FIG. 3 is a view for schematically explaining a processing sequence for printing a print job stored in the removable medium serving as an external storage device by using the image printing apparatus 200.

First, the print data generated by an arbitrary application on the host computer 101 is stored in a portable removable medium. The removable medium is set in the removable medium drive 204 in the image printing apparatus 200 from which the removable medium drive is detachable (step S31). Upon setting the removable medium in the removable medium drive 204, if the print data is stored in the removable medium, as shown in window 1, a confirmation window is displayed on a display unit 203 to confirm whether printing (print) of the print data is to be executed (step S32).

Figure 4A:
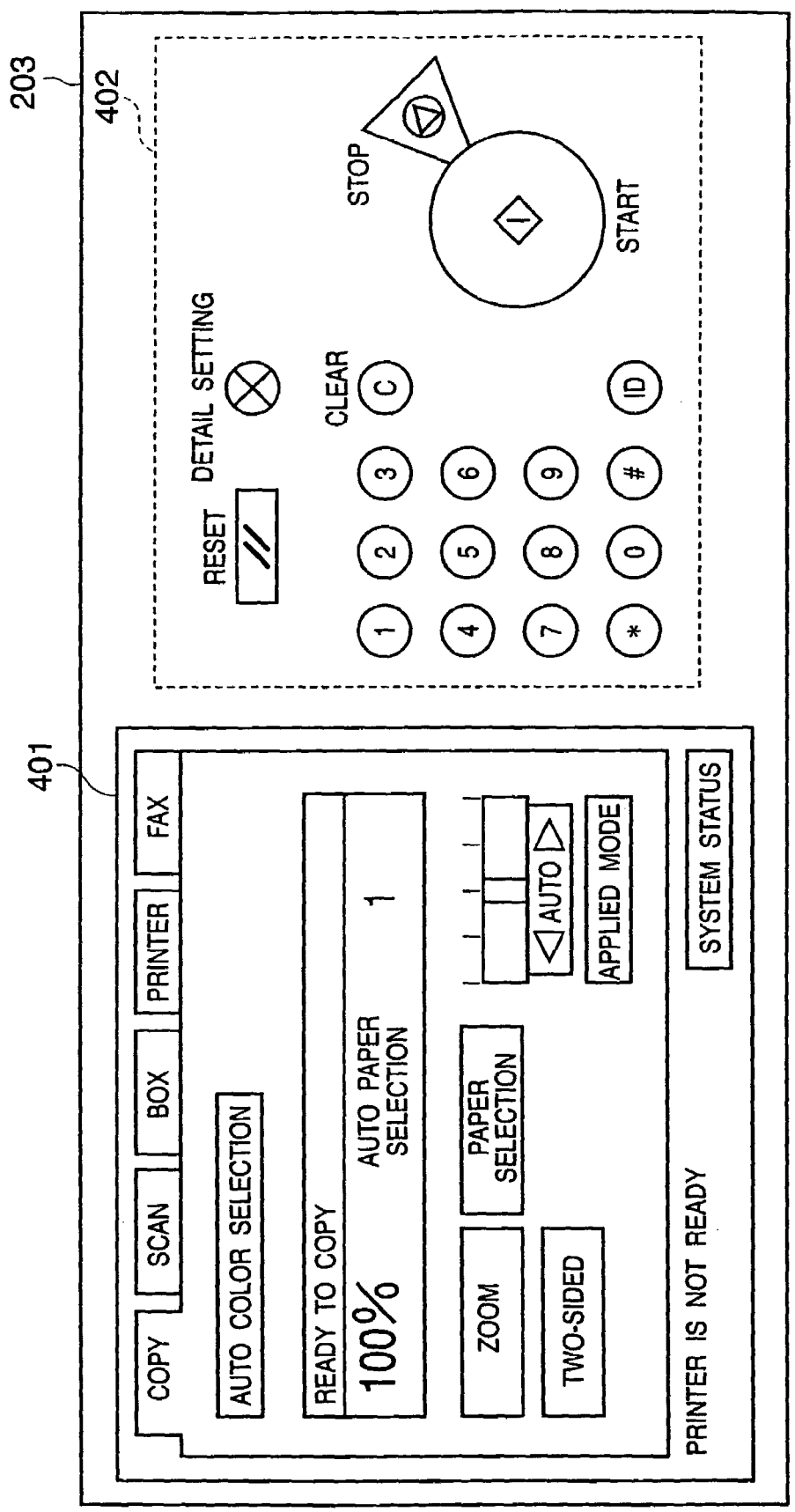
FIG. 4A is a view showing the outer appearance of an example of a display unit 203 of the image printing apparatus 200 according to the first embodiment of the present invention.

FIGS. 4A and 4B are views each showing the outer appearance of an example of the display unit 203 of the image printing apparatus 200 according to the first embodiment of the present invention. As shown in FIG. 4A, the display unit 203 comprises a window display unit 401 and ten-key pad 402. The window display unit 401 can be operated in a touch-key mode and switched to a window corresponding to respective functions such as copying, scanning, and printing. The window shown in FIG. 4A is an example of a copy window, in which various types of setting items required for copying operation (e.g., double-side setting or paper selection) are displayed. In the lower left of the window, for example, the current status of the system is displayed and in the lower right, a button for displaying a window to show the details of the system status is arranged.

In the ten-key pad 402, a reset button for resetting the setting, a detail setting button for displaying a detail setting window such as a user mode, "0" to "9" keys, a copy button for starting a copy operation, stop button for stopping a copy operation, and the like, are arranged.

FIG. 4B is a view showing an example of a case in which window 1 (confirmation window) shown in FIG. 3 is displayed in a printer window (tab) of the window display unit 401 shown in FIG. 4A. Note that each of window 2, window 3 and window 4 shown in FIG. 3 is displayed in the printer window of the window display unit 401 of the display unit 203 in the same manner as a display example of window 1 shown in FIG. 4B, and can be operated by a touch-panel key and the like.

When a user selects "YES" (i.e., execute printing) in window 1 in FIG. 3, under the control of the core unit 201, the print data in the removable medium inserted in the removable medium drive 204 is read out and the controller unit 207 executes an development process (image processing). Upon completion of the development process, as shown in window 2 of FIG. 3, the window used to confirm whether to store the data developed in the removable medium inserted in the removable medium drive 204 is displayed in the display unit 203. If "YES" (i.e., development in the removable medium) is selected in window 2, the developed data is written on the removable medium (step S33A).

On the other hand, if "NO" (i.e., execution in the HDD 206 in the image printing apparatus 200) is selected in window 2, the developed image data is stored in the HDD 206 (step S33B).

Note that when "YES" is selected in window 2 (that is, when the development in the removable medium is selected) and when there is no free space sufficient to write the developed image data on the inserted removable medium, a message indicating that the free space is not sufficient is displayed on the display unit 203, as shown in window 3. Simultaneously, a message to prompt the user to set another removable medium which has a sufficient free space is displayed on the display unit 203.

If an OK button in window 3 is selected, the free space of the inserted removable medium is checked (detected). As a consequence, if the removable medium has a sufficient free area, the flow advances to the next step. If the removable medium does not have a sufficient space, window 3 is displayed again to repeat the process until the sufficient free space is confirmed. If the cancel button is selected in window 3, the printing process is interrupted.

After the process as described above is executed and the developed image data is written on the removable medium, the image data is written in the frame buffer of the RAM 205 serving as a temporary storage area (step S34A). The written image data is then sent to the printer unit 208 and printed out on the printing medium. Similarly, when the developed image data is stored in the HDD 206 in the image printing apparatus 200, the print image data is written in the frame buffer of the RAM 205 serving as the temporary storage area (step S34B). The written image data is then sent to the printer unit 208 and printed out on the printing medium.

Upon completion of the printing on the printing medium, as shown in window 4, a window used to prompt the user to select whether the developed image data is to be stored in the removable medium (or HDD 206) or to be deleted from the removable medium is displayed in the display unit 203. If "YES" (i.e., deletion) is selected, the developed image data stored in the removable medium (or HDD 206) is deleted. If "NO" (that is, keep the data without deletion) is selected in window 4, the developed image data stored in the removable medium (or HDD 206) remains stored without being deleted.

When the developed image data is stored without being deleted and the removable medium is set in the removable medium drive 204 again, the development process shown in the above-described process step S33 is not executed but the same printing process is executed by using a copy of the image data developed in the frame buffer in the RAM 205. Since this eliminates the need for the development process, the printing can be completed in a shorter time than the case when the development process is executed.

Figure 5:
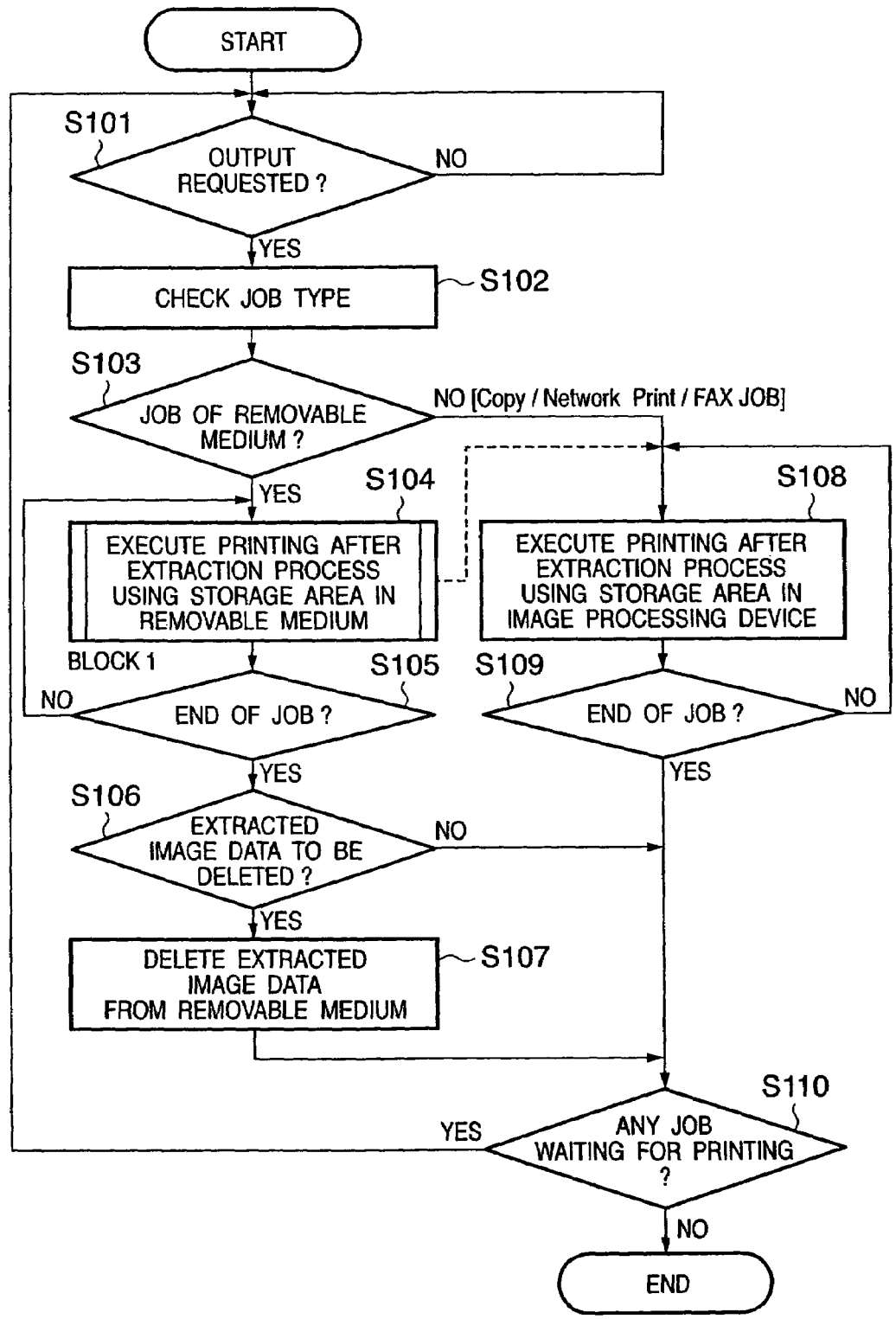
FIG. 5 is a flowchart for explaining a processing sequence upon executing a printing process by the image printing apparatus 200 according to the first embodiment of the present invention.

FIG. 5 is a flowchart for explaining a processing sequence upon executing the printing process by the image printing apparatus 200 according to the first embodiment of the present invention. First, the image printing apparatus 200 checks whether an output of the print data is requested (step S101). In consequence, if the output of the print data is not requested (NO), the apparatus remains on standby without executing the process. If the output of the print data is requested (YES), then the apparatus checks a type of a requested print job (step S102).

The apparatus detects and determines whether the type of the print job checked in step S102 is a job of the removable medium (step S103). In consequence, if the job is determined as the job of the removable medium (YES), the development process is executed using the storage area in the removable medium and the printing is executed (step S104: block 1). Note that the details of the process will be described later using FIG. 7.

After the printing is executed in step S104, the apparatus checks whether the job is completed (step S105). In consequence, if the job is completed (YES), a window used to confirm whether the developed image data is to be deleted or stored is displayed in the display unit 203 and the decision is made by designation of the user or the like (step S106). If the image data is designated to be deleted (YES), the (developed) image data stored in the removable medium is deleted (step S107).

On the other hand, if the job is determined not to be the job of the removable medium (that is, a copy job, print job via the network, FAX job, or the like) in step S103, the development process is executed using the HDD 206 in the image processing apparatus and the printing is executed (step S108). Note that contents of the printing process in step S108 are not limited particularly and a general printing process can be executed. The apparatus checks whether the job is completed (step S109) and if it is completed (YES), the flow advances to the next step.

When the (developed) data is determined not to be deleted (NO) in step S106, when the (developed) image data is deleted from the removable medium in step S107, and when the print job is determined to be completed (YES) in step S109, whether another waiting job is present is checked (step S110).

If a waiting job is present (YES), the flow returns to step S101 to repeat the processes described above. On the other hand, if no waiting job is present (NO), the process is terminated.

In step S104, as described with reference to FIG. 3, the development process is designated to be executed using the HDD 206 in the image printing apparatus 200 since the removable medium has no free area sufficient to store the developed image data, the flow advances to step S108.

Figure 6:
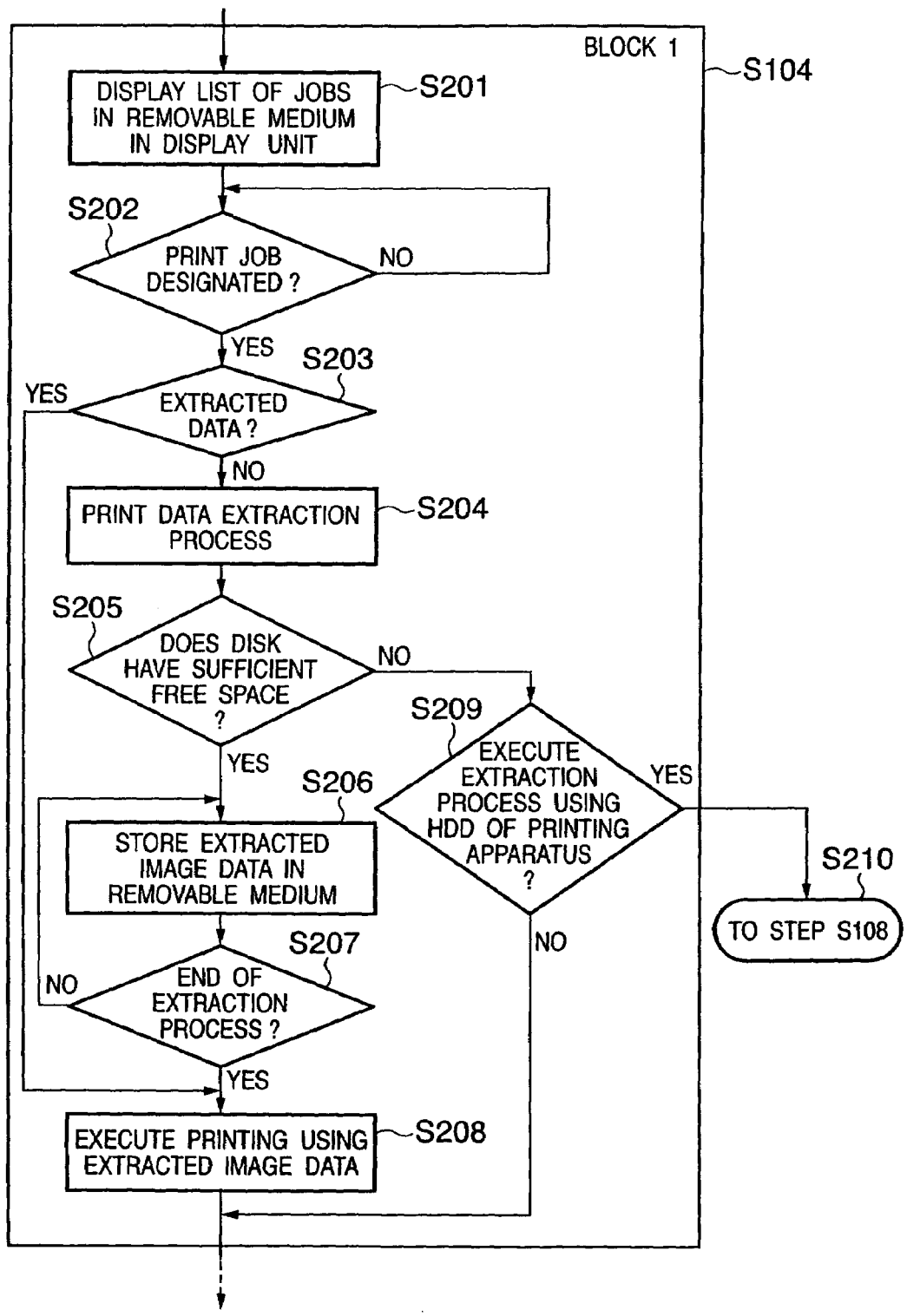
FIG. 6 is a flowchart for explaining details of a process (step S104: block 1) in the flowchart shown in FIG. 5, in which an image is developed and printed using a storage area in the removable medium.

FIG. 6 is a flowchart for explaining the details of the process (step S104: block 1) in the flowchart shown in FIG. 5, in which the image is developed and printed using the storage area in the removable medium.

When the removable medium is set in the removable medium drive 204, a list of jobs stored in the removable medium is displayed on the display unit 203 (step S201). It is checked whether a job to execute the printing is designated from the list of jobs displayed on the display unit 203. When the job to execute the printing is designated (YES), it is checked whether the job is the developed data (step S203).

When the job is not the developed data (NO), the development process of the print data is executed by the controller unit 207 (step S204). Upon completion of the development process, it is checked whether the removable medium has a free area to write the (developed) image data (step S205). If the removable medium has a free area (YES), the image data developed in step S204 is written on the removable medium (step S206). Note that this process is repeated until the development process is completed and the developed image data is written on the removable medium (step S207). If the development process is determined to be completed in step S207 (YES), the printing process is executed using the developed image data (step S208). Then, the process advances to step S105 shown in FIG. 5. Similarly, if the job is determined to be the developed data in step S203 (YES), the printing process is executed using the developed image data (step S208).

In step S205, if the removable medium does not have a free area sufficient to store the developed image data (NO), a window used to confirm whether the development process is executed using the HDD 206 in the image printing apparatus 200 is displayed in the display unit 203 to make the user or the like to determine whether to execute the development process (step S209). Consequently, if it is designated to execute the development process using the HDD 206 (YES), the flow advances to a printing execution process of step S108 in the flowchart in FIG. 5 (step S210). On the other hand, if the development process is not executed (NO), the process of block 1 is terminated and the process advances to step S105 in FIG. 5.

As has been described above, upon printing the print data read out from the detachable external storage device, e.g., removable disk, connected to the image printing apparatus 200, executing the development process using the storage area of the external storage device makes it possible to ensure the security of the print data since the print data is not stored in the internal storage device (HDD) of the image printing apparatus.

Also, whether the print data developed in the storage area of the external storage device is to be stored or deleted can arbitrarily be selected after the printing is completed. If the print data is selected to be deleted, reprinting by the third party without permission can be avoided by deleting the data completely, which enables to ensure high security. On the other hand, if the developed image data is selected to be stored, since reprinting can be executed without the development process of the same print data when reprinting is needed, the reprinting can be completed in a short time.

Second Embodiment

In the first embodiment described above, an example has been described in which, when printing using a removable medium, developed image data is processed using a storage area in the removable medium. In the second embodiment, an example will be described in which, when executing a variable data printing which combines a background image and variable data and prints out, only a part (variable data part) which requires security is developed using the storage area in the removable medium.

FIG. 7 is a view for schematically explaining a flow of a variable data printing process in the second embodiment of the present invention. Note that the arrangement of an image printing apparatus used in the second embodiment is the same as the image printing apparatus 200 according to the first embodiment described above.

Since the flow of a basic printing process of the variable data printing process according to this embodiment is the same as the printing process in the first embodiment described using FIG. 3, in a description of the printing process according to this embodiment using FIG. 7, a process different from the process described using FIG. 3 is focused and the details of the contents described using FIG. 3 will be omitted.

First, print data generated by an arbitrary application on a host computer 101 is stored in a removable medium and is set in a removable medium drive 204 of an image printing apparatus 200 (step S71A). At this time, not all the jobs but only a variable data part may be stored in the removable medium and a background image part may be transmitted to the image printing apparatus 200 via a network 100 and stored in an HDD 206 in the image printing apparatus 200 (step S71B).

Note that an example of the variable data may be an address book which stores names and addresses as data, as shown in a table 701 in FIG. 7.

When the medium is set in the removable medium drive 204 and a print job is stored in the removable medium, a window used to confirm whether printing is executed is displayed as shown in window 1 of FIG. 3.

If "YES" (i.e., execute the printing) is selected in window 1 shown in FIG. 3, print data in the removable medium inserted in the removable medium drive 204 is read out. A controller unit 207 executes an development process (image processing) of the readout print data to image data. In this manner, after the development process of the variable data part is completed, the developed image data is written on the removable medium (step S72A).

On the other hand, as shown in step S71B of FIG. 7, when the background image part is stored in the HDD 206 in the image printing apparatus 200 via the network 100, the developed data of the background image part will be stored in the HDD 206 (step S72B).

(Developed) image data 702 of the variable data part stored in the removable medium is read out from the removable medium and sent to a frame buffer of a RAM 205 serving as a temporary storage area (step S73A). Similarly, (developed) image data 703 of the background image part stored in the HDD 206 is read out from the HDD 206 and sent to the frame buffer of the RAM 205 serving as the temporary storage area (step S73B).

The image data 702 of the variable data part sent to the frame buffer of the RAM 205 and the image data 703 of the background image part is combined. Combined print data 704 is sent to a printer unit 208 and printed on a printing medium (step S74).

Upon completion of the printing on the printing medium, as shown in window 705 (window 5) in FIG. 7, a window used to select a storage method of the developed image data is displayed. If a user selects "store all" in the window, both the developed data of the background image part (i.e., developed data stored in the HDD 206) and the developed data of the variable data part (developed data stored in the removable disk) are stored in the removable medium. If the user selects "store", only the developed image data stored in the removable medium remains stored. Furthermore, if the user selects "delete", the developed image data stored in the removable medium (or HDD 206) is deleted.

In this embodiment, when the image data developed in the removable medium is stored without being deleted and the removable medium is set in the removable medium drive 204 again, the development process shown in the above-described step S72A (or step S72B) is not executed. In this case, the same printing process is executed by copying the developed image data in the frame buffer in the RAM 205. Since this obviates the need for another development process, the printing can be completed in a short time.

The method of combining the variable data part and background image part and outputting the resultant data is not limited to the method described in this embodiment. The method can arbitrarily be set by the user by displaying a window (not shown), in the display unit 203, to select any data acquirable from the data stored in advance in the HDD 206 of the image printing apparatus 200 or via the network 100.

As has been described above, in the variable data printing, the development process of a part required security protection is executed using the storage area of the external storage device. This makes it possible to execute printing even when the storage capacity of the external storage device is small. Also, security can be protected and cost required for printing can be minimized.

Other Embodiment

The embodiments of executing printing by obtaining print data from a portable external storage device, i.e., a removable medium, detachable to a printing apparatus has been described above. However, the printing may be executed by acquiring the print data directly from an external device such as a host computer 102 connected via a network 100 and developing the print data to image data using a storage area of the external device.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

In accordance with the present invention, the printing process can be preferably executed using the print data input to the printing apparatus via the external storage device without decreasing the speed of the printing process speed while ensuring security of classified information contained in the print data.

As many apparently widely different embodiments of the present invention can be made without departing from the spirit and scope thereof, it is to be understood that the invention is not limited to the specific embodiments thereof except as defined in the claims.

CLAIMS OR PRIORITY

This application claims priority from Japanese Patent Application No. 2004-264596 filed on Sep. 10, 2004, the entire contents of which are hereby incorporated by reference herein.

What is claimed is:

1. A data output device comprising:
an input unit adapted to be capable of inputting at least data of a specific storage unit;
an output unit adapted to output an input data;
a storage unit different from said specific storage unit;
a controller adapted to generate data to be output by said output unit using a storage area of said specific storage unit when output of data of said specific storage unit is executed by said output unit, to execute, using a storage area of said specific storage unit, a first generation process for, of data of said specific storage unit, data of a part which requires high security, and to execute a second generation process for data of a remaining part of data of said specific storage unit using a storage area of said storage unit; and
a selector adapted to select any one of a mode to store both data generated by the first generation process and data generated by the second generation process in said specific storage unit, a mode to store only data generated by the first generation process in said specific storage unit, and a mode to delete both data generated by the first generation process and data generated by the second generation process.

2. The apparatus according to claim 1,
wherein said specific storage unit includes a detachable external storage device,
said input is configured to input at least data stored in said detachable external storage device,
said output unit includes a printer unit which is capable of printing data stored in said detachable external storage device, and
said controller executes a developing process for data to be printed by said printer unit using a storage area of said detachable external storage device when printing of data of said detachable external storage device is executed by said printer unit.

3. The apparatus according to claim 1,
wherein said controller selectively executes a first mode to generate data to be output by said output unit by using said specific storage unit and a second mode to generate data to be output by said output unit using a storage area of said storage unit.

4. The apparatus according to claim 3, further comprising an area detection unit adapted to detect a free area of a storage area of said specific storage unit,
wherein said controller switches the first mode and second mode on the basis of a free area space detected by said area detection unit.

5. The apparatus according to claim 3, further comprising a designation unit adapted to designate whether the data to be output stored in the storage area of said specific storage unit is stored or deleted after completing output of the data to be output by said output unit.

6. The apparatus according to claim 3,
wherein said input unit is configured to input data from said specific storage unit and data from another device different from said specific storage unit, and
said controller makes the first mode execute when input data is data from said specific storage unit and makes the second mode execute when input data is data from said another device.

7. The apparatus according to claim 1, further comprising a storage unit different from said specific storage unit,
wherein said controller is configured to execute a process of combining data generated using a storage area of said storage unit data generated using a storage area of said specific storage unit.

8. The apparatus according to claim 1,
wherein the apparatus is configured to receive, as a second type job different from a first type job execute a printing process of the data stored in said specific storage unit, at least one of a job to execute a printing process of data from a document sheet reading unit and a job to execute a printing process of data transmitted from an external device,
said output unit includes a printer unit adapted to execute a printing process, and
said controller makes said printer unit execute a printing process using a storage area of said specific storage unit when a job to be processed is the first type job and makes said printer unit execute a printing process using a storage area of a storage unit included in the data output apparatus when a job to be processed is the second type job.

9. A data output method comprising:
a step of inputting data using an input unit adapted to be capable of inputting at least data of a specific storage unit;
a step of outputting data using an output unit adapted to output input data; and
a step of controlling using a controller adapted to generate data to be output by the output unit using a storage area of the specific storage unit when output of data of the specific storage unit is executed by the output unit, to execute, using a storage area of said specific storage unit, a first generation process for, of data of said specific storage unit, data of a part which requires high security, and to execute a second generation process for data of a remaining part of data of said specific storage unit using a storage area of a storage unit which is different from said specific storage unit; and
a step of selecting using a selector adapted to select any one of a mode to store both data generated by the first generation process and data generated by the second generation process in said specific storage unit, a mode to store only data generated by the first generation process in said specific storage unit, and a mode to delete both data generated by the first generation process and data generated by the second generation process.

10. A program making a computer execute a data output method according to claim 9.

11. A computer readable storage medium storing a program for making a computer execute a data output method according to claim 9.

* * * * *